United States Patent [19]

Yamazaki

[11] 4,073,505
[45] Feb. 14, 1978

[54] STAND DEVICE FOR A TWO-WHEELED MOTORCYCLE

[75] Inventor: Yorio Yamazaki, Kakogawa, Japan

[73] Assignee: Kawasaki Jukogyo Kabushiki Kaisha, Hyogo, Japan

[21] Appl. No.: 705,253

[22] Filed: July 14, 1976

[30] Foreign Application Priority Data

July 30, 1975 Japan ............................ 50-106079[U]

[51] Int. Cl.² .............................................. B62H 1/06
[52] U.S. Cl. ..................................... 280/301; 280/293
[58] Field of Search ....................... 280/301, 293, 298; 180/33

[56] References Cited

U.S. PATENT DOCUMENTS

| 607,779 | 7/1898 | Welch | 280/301 |
| 1,584,096 | 5/1926 | Henderson | 280/301 |
| 2,300,762 | 11/1942 | Andrews | 280/301 X |
| 3,918,743 | 11/1975 | Sato | 280/293 |

Primary Examiner—Joseph F. Peters, Jr.
Assistant Examiner—Terrance L. Siemens
Attorney, Agent, or Firm—Toren, McGeady and Stanger

[57] ABSTRACT

A stand device for a two-wheeled motorcycle having a pivotal member supported by a shaft supporting a motorcycle stand for pivotal movement, the pivotal member being capable of moving in pivotal movement independently of the motorcycle stand and including a tongue for moving the motorcycle stand from an operative position in which it is tilting forwardly to a neutral position as the pivotal member moves pivotally. A main spring is mounted between the upper portion of the pivotal member and the intermediate portion of the motorcycle stand, and the pivotal member is urged by the biasing force of an auxiliary spring so as to cause the motorcycle stand to return from its operative position to its neutral position.

5 Claims, 5 Drawing Figures

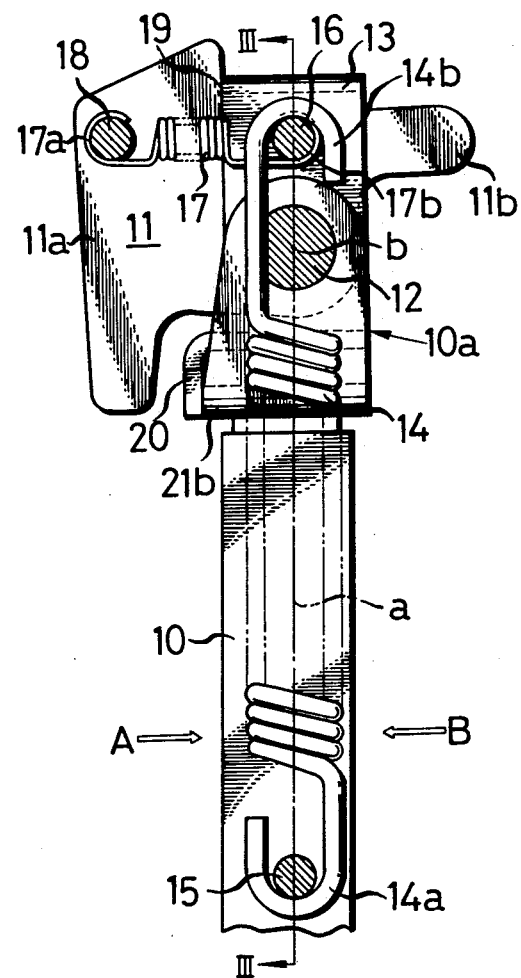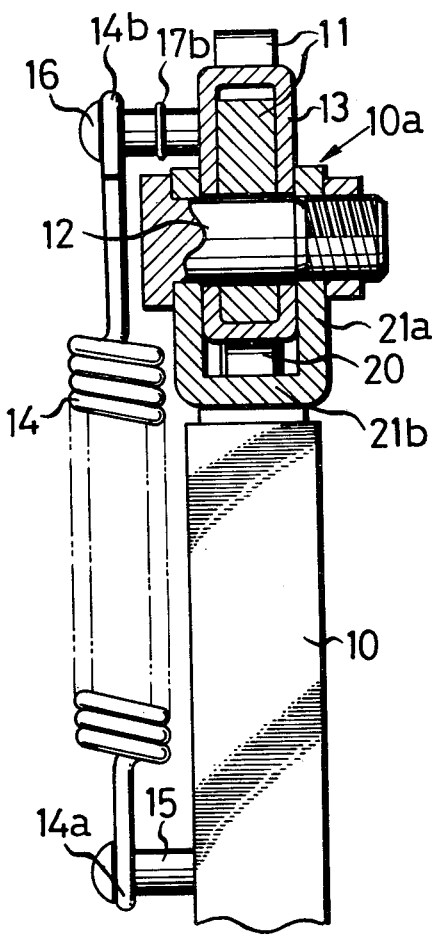

STAND DEVICE FOR A TWO-WHEELED MOTORCYCLE

BACKGROUND OF THE INVENTION

This invention relates to stand devices for two-wheeled motorcycles, and more particularly it is concerned with a stand device for a two-wheeled motorcycle of the type which ensures the safety of the driver when the motorcycle is inadvertently operated with its stand in an operative position.

Generally, a stand of the stand device for a two-wheeled motorcycle is pivotally supported by a bracket attached to a body frame of the motorcycle and is urged by the biasing force of a spring so that the stand may be kept in an inoperative position or in an operative position in which its free end portion tilts forwardly to support the motorcycle positively when the motorcycle is not running.

In the event that the driver forgets to move the stand from its operative position to its inoperative position when he starts the engine and brings the motorcycle to running condition, there is the danger of impinging on the surface of the road by the forwardly tilted end of the stand, for example, which causing to overturn the motorcycle and bring unexpected injury on the driver. This is because stand devices of the prior art are not provided with means for automatically moving the motorcycle stand from its operative position to its inoperative position when the forwardly projecting end of the stand impinges against the surface of the road or some object on the road in a position of the motorcycle is running.

SUMMARY OF THE INVENTION

The principal object of the present invention to provide a stand device for a two-wheeled motorcycle which obviates the aforementioned disadvantage of the prior art and which enables the motorcycle to be positively supported by the motorcycle stand disposed in an operative position in which the stand tilts forwardly as the motorcycle remains stationary and rests against the stand, and which automatically moves the stand from its operative position to its neutral position when the motorcycle is brought to an upright posture.

According to the present invention, there is provided a stand device for a two-wheeled motorcycle including means whereby the stand can be automatically brought to the inoperative position when the free end of the stand impinges against the surface of the road or some object on the road. Thus, in the event that the driver forgets to move the stand to the inoperative position when he starts the engine and brings the motorcycle to running condition, the invention operates to prevent overturning of the motorcycle by the reaction of the impact caused by collision of the free end of the stand with the surface of the road.

BRIEF DESCRIPTION OF THE DRAWINGS

FIG. 2 is a side view of the stand device comprising one embodiment of the invention, with the stand being disposed in a neutral position;

FIG. 3 is a sectional view taken along the line III—III of FIG. 2;

DESCRIPTION OF THE PREFERRED EMBODIMENT

A preferred embodiment of the invention will now be described with reference to the accompanying drawings.

Figure 1:
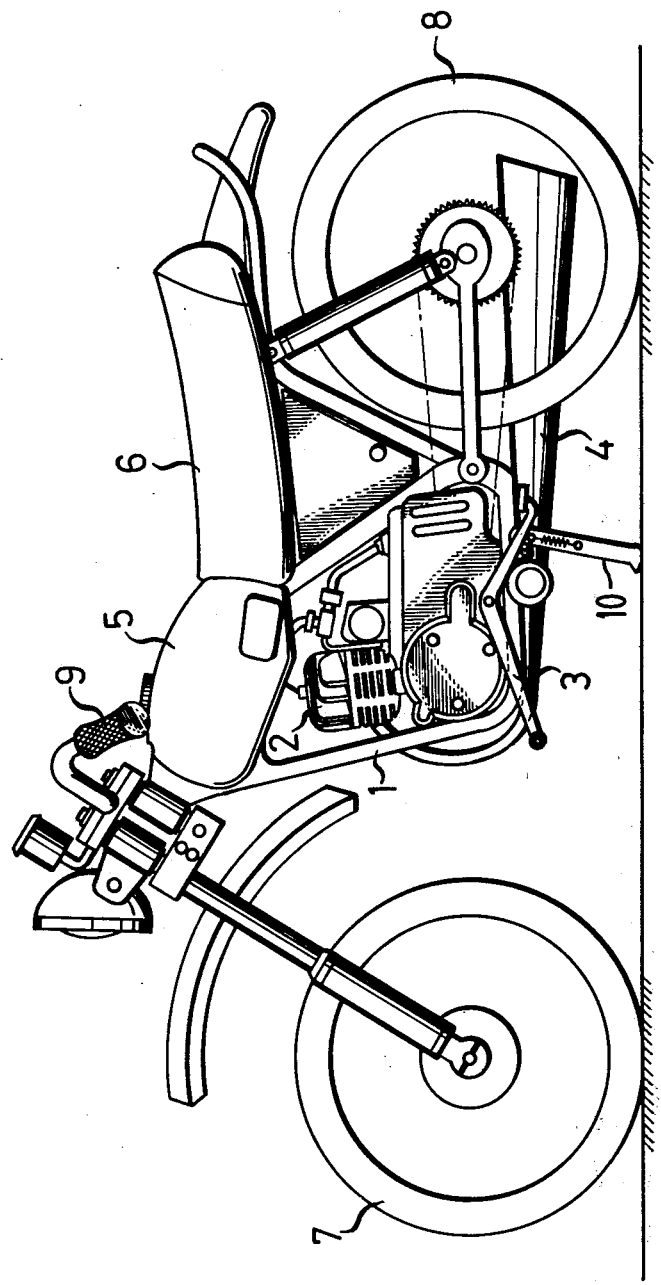
FIG. 1 is a schematic side view of a two-wheeled motorcycle having a stand device conforming with the present invention.

FIG. 1 shows in a side view a two-wheeled motorcycle having a stand device conforming with the present invention, comprises a body frame 1, an engine 2, a gear shifting pedal 3, an exhaust muffler 4, a fuel tank 5, a seat 6, a front wheel 7, a rear wheel 8, a handle 9 and a stand 10.

The stand device will now be described in detail with reference to FIG. 2 and FIG. 3. The body frame 1 has secured thereto a bracket 11, and a shaft 12 extending through the bracket 11 pivotally supports the stand 10 at an upper end portion 10a thereof. The upper end portion 10a of the stand 10 is in the form of a letter U, and the bracket 11 includes a projecting portion 11b which extends between vertical portions 21a of the U-shaped upper portion 10a of the stand 10. A pivotal member 13 which is hollow and rectangular in cross-section is positioned between the two vertical portions 21a of the U-shaped upper portion 10a of the stand 10 and supported by the shaft 12 for pivotal movement independently of the stand 10. The projecting portion 11b of the bracket 11 extends through the hollow interior of the pivotal member 13.

The pivotal member 13 has attached to its lower end a tongue 20 which extends downwardly from the pivotal member 13 along a base 11a of the bracket 11 in such a manner that its forward end can be brought into engagement with a horizontal portion 21b of the U-shaped upper portion 10a of the stand 10. The tongue 20 performs the function of moving the stand 10 from its operative position shown in FIG. 5 in which it is tilting forwardly to its neutral position shown in FIG. 2 as the tongue 20 shifts its position as a result of the pivotal movement of the pivotal member 13.

Figure 5:
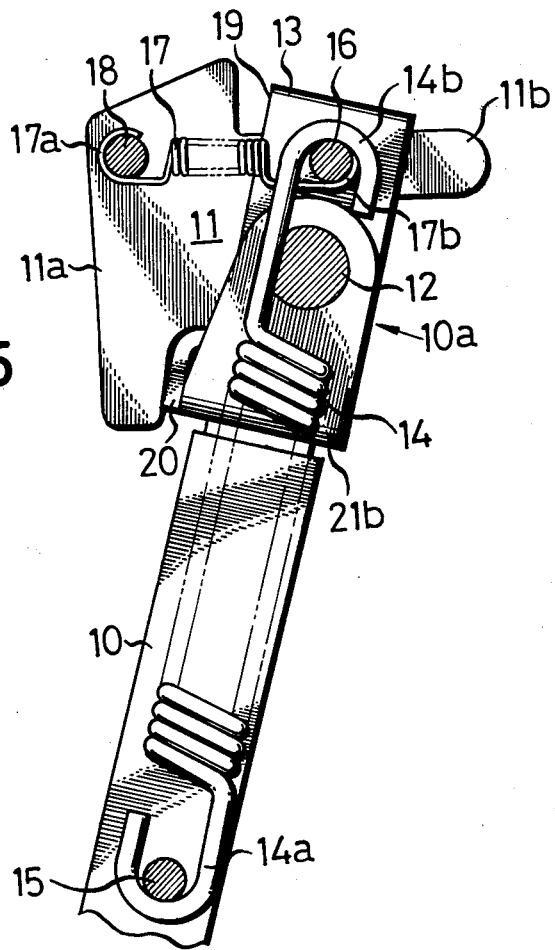
FIG. 5 is a side view of the stand device shown in FIG. 2, with the stand being disposed in an operative position in which the stand tilts forwardly.

The pivotal member 13 can pivotally move about the shaft 12 between a position in which an upper side surface 19 of the member 13 abuts against the base 11a of the bracket 11 as shown in FIG. 2 and a position in which the tongue 20 abuts against the base 11a of the bracket 11 as shown in FIG. 5.

The numeral 14 designates a main spring supported at one end portion 14a by a pin 15 attached to the intermediate portion of the stand 10 and at the other end portion 14b by a pin 16 attached to an upper portion of the pivotal member 13. The numeral 17 designates an auxiliary spring supported at one end portion 17a by a pin 18 attached to the base 11a of the bracket 11 and at the other end portion 17b by the pin 16 attached to the pivotal member 13. The position of the pin 16 attached to the pivotal member 13 is set such that when the stand 10 is in its neutral position and the upper side surface 19 of the pivotal member 13 is maintained in abutting engagement with the base 11a of the bracket 11 as shown in FIG. 2, a line $a$ connecting together the pin 15, the center axis $b$ of the shaft 12 and the pin 16 is straight. In FIG. 2, the auxiliary spring 17 is shown as urging, by its biasing force, the pivotal member 13 in a direction which is normal to the main spring 14 when the stand 10 is in its neutral position. However, the present invention is not limited to this arrangement, and the auxiliary spring 17 may be mounted in any manner as desired, so long as it urges the pivotal member 13 to move counterclockwise about the shaft 12 in FIG. 2.

Figure 4:
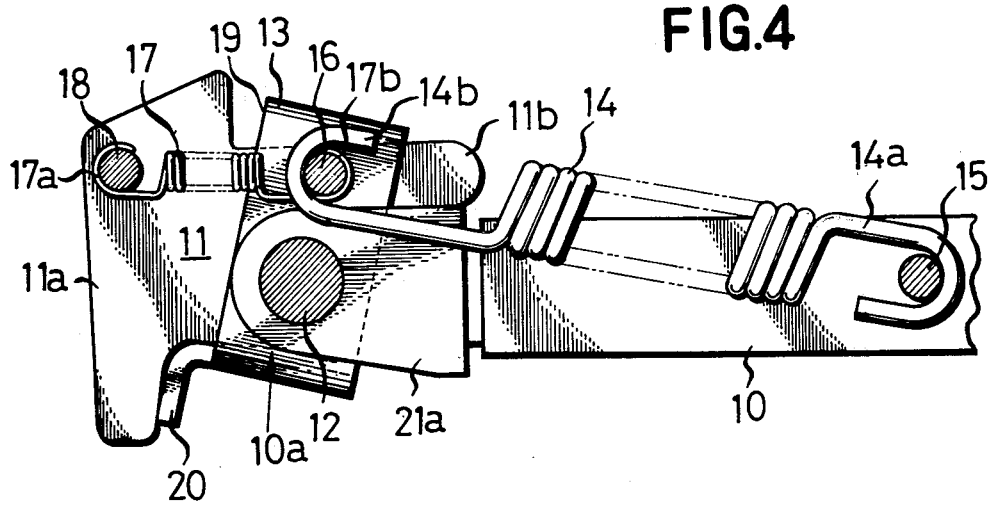
FIG. 4 is a side view of the stand device shown in FIG. 2, with the stand being disposed in an inoperative position.

The horizontal portion 21b of the upper portion 10a of the stand 10 is adapted to be brought into abutting engagement with the tongue 20 extending from the lower end of the pivotal member 13. Thus, the forward movement of the stand 10 along the longitudinal axis of the motorcycle is restricted by the abutting engagement of the tongue 20 with the base 11a of the bracket 11 as shown in FIG. 5. Since the pivotal member 13 moves together with the stand 10 as a unit as the stand 10 shifts to its operative position, the line connecting together the pins 15, 16 and the center axis b remains straight. Thus, the stand 10 disposed in its operative position automatically moves to the neutral position shown in FIG. 2, because, when the weight applied to the motorcycle stand is removed, the pivotal member 13 is moved counterclockwise from its operative position in FIG. 5 by the biasing force of the auxiliary spring 17. The rearward movement of the stand 10 along the longitudinal axis of the motorcycle is restricted by the abutting engagement of the horizontal portion 21b of the upper end portion 10a of the stand 10 with the projection 11b of the bracket 11 as shown in FIG. 4.

The operation of the stand device constructed as aforementioned will now be described. In FIG. 1, the motorcycle is stationary and shown in an inclined posture, and the weight of the motorcycle is applied to the stand 10 in its operative position. If the motorcycle is brought to an upright posture and the weight applied to the stand 10 in its operative position as shown in FIG. 5 is removed, the pivotal member 13 will be automatically moved counterclockwise about the shaft 12 from its position in FIG. 5 to its position in FIG. 2 by the biasing force of the auxiliary spring 17, so that the upper side surface 19 of the pivotal member 13 is brought into abutting engagement with the base 11a of the bracket 11. At this time, the tongue 20 and the horizontal portion 21b of the U-shaped upper portion 10a of the stand 10, which are in engagement with each other, move as a unit in a manner to move the stand 10 to its neutral position shown in FIG. 2.

If the engine is started and the motorcycle begins to run with the stand 10 in its neutral position, the free end of the stand 10 will impinge against the surface of the road. Then, a force acting in the direction of an arrow A is exerted on the stand 10, and the line $a$ connecting the pins 15 and 16 supporting the main spring 14 is displaced rightwardly of the center axis $b$ of the shaft 12 as shown in FIG. 2. This rightward displacement of the line $a$ connecting the two pins 15 and 16 results in the compression of the main spring 14 which reduces the distance between the pins 15 and 16, with a result that the stand 10 moves counterclockwise about the shaft 12 from its neutral position as shown in FIG. 2 to its inoperative position as shown in FIG. 4. The spring force of the main spring 14 is set at a level higher than that of the auxiliary spring 17, so that the pivotal member 13 pivots clockwise about the shaft 12 till the tongue 20 abuts against the base 11a of the bracket 11. Thus, the stand 10 is maintained in its inoperative position as shown in FIG. 4.

When one desires to stop the motorcycle and hold it in a stationary position, and one applies its weight to the stand 10, one has only to exert a force on the stand 10 in the direction of an arrow B, as shown in FIG. 2, to bring the stand 10 to its operative position in which it tilts forwardly. Once the stand 10 is tilted to its operative position and is applied with the weight of the motorcycle, the stand 10 is locked in its operative position as shown in FIG. 5 without being restored to its neutral position by the biasing force of the auxiliary spring 17. Thus, the motorcycle can be positively supported by the stand 10.

From the foregoing description, it will be appreciated that according to the present invention the stand 10 can be automatically brought to its neutral position if the motorcycle is brought to an upright posture and the weight applied to the stand 10 by the body of the motorcycle is removed. The stand disposed in its neutral position can be automatically brought to its inoperative position by exerting a force thereon, no matter how small the force may be. Thus, the invention not only facilitates the movement of the stand 10 to its inoperative position but also eliminates the danger of the overturning of the motorcycle even if the driver forgets to move the stand to its inoperative position before starting the engine and driving the motorcycle. The present invention also enables the body of the motorcycle to be positively supported by the stand if the stand is moved forwardly from its neutral position and the weight of the motorcycle is applied to the stand.

It is to be understood that the bracket can be eliminated and the shaft may be supported by any portion of the body frame.

What I claim is:

1. A stand device for a two-wheeled motorcycle including a body frame comprising:
    a. a stand pivotally supported by a bracket attached to said body frame of the motorcycle;
    b. a pivotal member capable of moving in pivotal movement about a point at which said stand is pivoted and including an upper portion above said point, said pivotal member moving in pivotal movement independently of said stand and having a portion which moves said stand from its operative position to its neutral position;
    c. a main spring mounted between the upper portion of said pivotal member and said stand; and
    d. an auxiliary spring mounted between the upper portion of said pivotal member and the bracket and adapted to urge by its biasing force the pivotal member to act in such a manner that the stand is restored from its operative position to its neutral position.

2. A stand device as claimed in claim 1, wherein said main spring includes an upper end connected to said upper portion of said pivotal member, with the position at which the upper end of said main spring is supported being set such that, when said pivotal member is caused by the auxiliary spring to be disposed at one limit of the range of its pivotal movement, the point at which said stand is pivoted is disposed on a line connecting the two positions at which both ends of the main spring are supported and the stand is brought to its neutral position.

3. A stand device as claimed in claim 1, wherein said stand includes an upper end portion in the form of a letter U and said pivotal member is disposed between two vertical portions of said U-shaped pivotal member, and wherein said portion of said pivotal member adapted to move said stand from its operative position to its neutral position comprises a tongue extending downwardly from the lower end of the pivotal member along the front of the horizontal portion of the U-shaped upper portion of the stand with respect to the longitudinal axis of the motorcycle.

4. A stand device as claimed in claim 3, wherein said tongue also performs the function of a stopper for setting one limit of the range of pivotal movement of said pivotal member.

5. A stand device as claimed in claim 1, wherein said bracket also performs the function of a stopper for limiting the pivotal movement of said stand.

* * * * *